July 4, 1939.    DE WITT T. HICKS ET AL    2,164,819

TIRE

Filed Dec. 31, 1936

INVENTOR
DeWitt T. Hicks
AND
Vernon L. Smithers
BY
ATTORNEY

Patented July 4, 1939

2,164,819

UNITED STATES PATENT OFFICE 2,164,819

TIRE

De Witt T. Hicks, Waco, Tex., and Vernon L. Smithers, Akron, Ohio

Application December 31, 1936, Serial No. 118,480

2 Claims. (Cl. 152—209)

This invention relates to tires such as pneumatic tires for motor vehicles, and more especially it relates to improved configuration of the tread portion thereof.

Tire designers long have recognized the advantages possessed by tire treads made up of small characters or elements, in that such treads more effectively prevent skidding due to the relatively great number of corners or edges that they present to the surface of the roadway. Previous attempts to embody this principle in tire treads have not been entirely satisfactory due to the fact that the tread characters have been laterally unstable and, therefore, tended to produce a lateral sway or weaving of the vehicle. If the grooves between adjacent characters were made sufficiently shallow to impart rigidity to the characters, the tread rapidly wore smooth or bald. Furthermore, the appearance of the tires was unattractive and sales resistance consequently developed.

The chief objects of this invention are to provide an improved tire tread composed of relatively small non-skid elements or characters that have lateral stability; that is more resistant to lateral skidding than tires heretofore provided; that is silent in operation due to the presence of continuous, circumferentially extending ribs on the tread; and to provide a tire tread that readily may be regrooved when worn to restore substantially the original condition of its tread design. More specific objects are to reduce tread wear such as occurs in laterally unstable tread characters as the result of lateral movement thereof; and to provide superior wiping (squeegee) action upon wet roadways. Other objects will be manifest as the specification proceeds.

In the present invention the foregoing objects are achieved in a tire having a tread portion formed with a multiplicity of continuous, circumferentially extending, parallel ribs, each of which is as wide, at least, as it is tall, the grooves between adjacent ribs being of various depths and so arranged that each rib is bounded on one side by a groove that is of no greater depth than the width of the rib.

Figure 1:
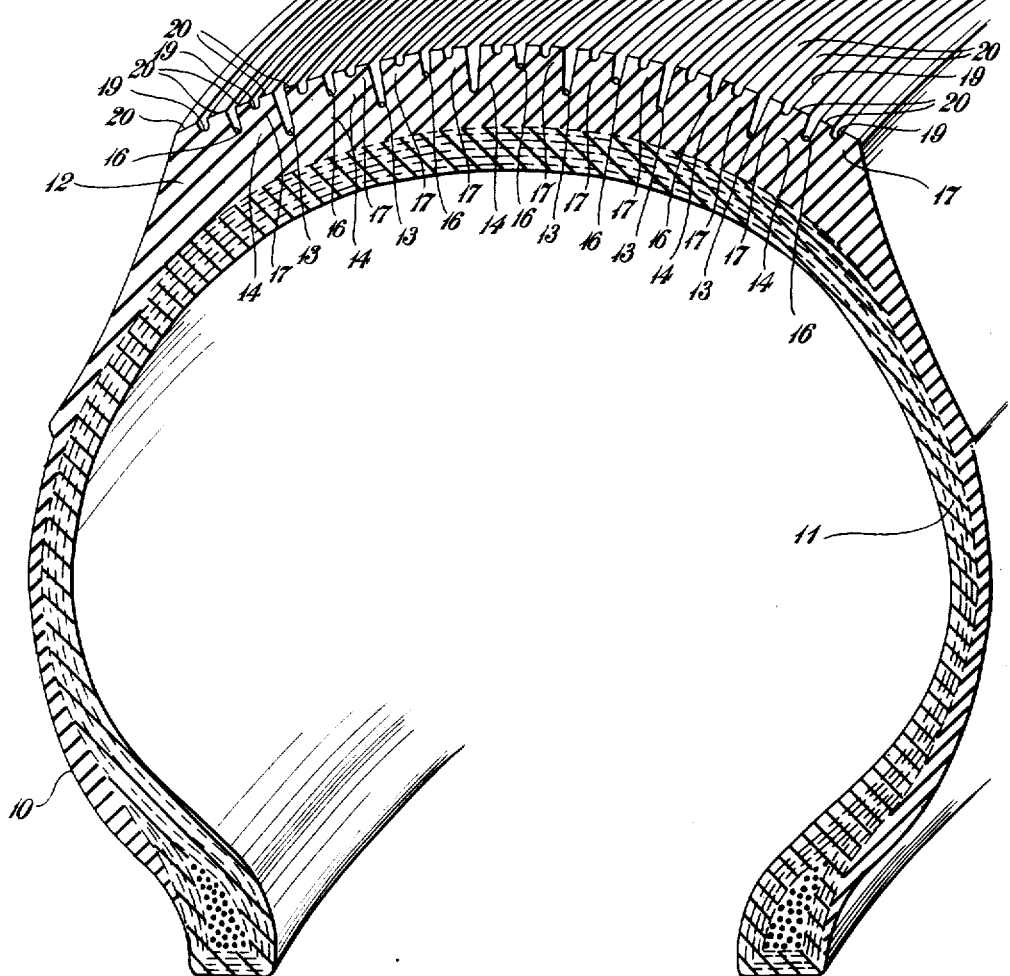
Figure 2:
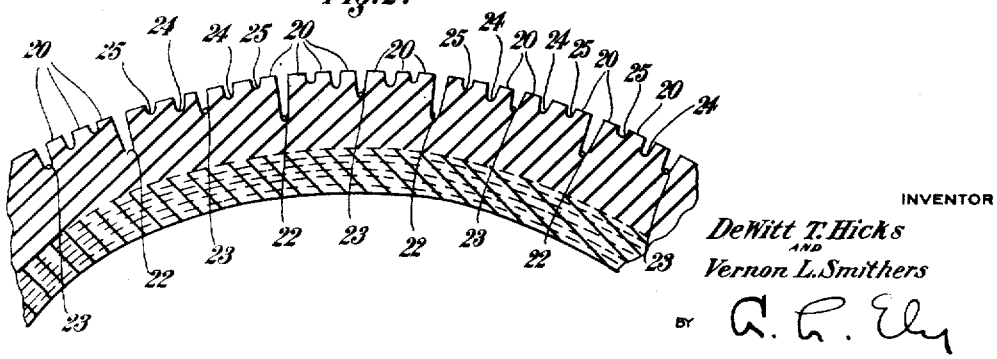

Of the accompanying drawing:

Figure 1 is a fragmentary sectional perspective view of a tire embodying the invention; and Figure 2 is a transverse section of a tire tread constituting another embodiment of the invention.

Referring now to Figure 1 of the drawing, there is shown a pneumatic tire casing, generally designed 10, that is formed with the usual cord fabric carcass 11 and has a tread portion 12 of abrasion-resisting rubber composition on the outer periphery thereof. The tread portion 12 of the tire is formed with a plurality of continuous, parallel, circumferential grooves 13, 13 that extend from the outer face of the tread substantially half way through the latter, said grooves being disposed radially of the transverse curvature of the tire, and being somewhat wider at the surface of the tire than at their bottoms so that the sides of the intervening ribs defined thereby are substantially parallel. The distance between adjacent grooves 13 is as great or greater than the depth of the grooves, so that the ribs defined thereby, designated 14, 14, are of greater width than height.

Each rib 14 is formed with a circumferential groove 16 that is disposed midway between the grooves 13, or, in the case of the ribs 14 at each side of the tread, midway between the groove 13 and the adjacent lateral margin of the tread. Like the grooves 13, the grooves 16 are disposed radially with relation to the transverse curvature of the tire. The depth of the grooves 16 is less than the width of the ribs defined by the latter and adjacent grooves 13, said ribs being designated 17, 17 and, in effect, being superposed upon the primary ribs 14 and being an integral part of the latter.

Each rib 17 is formed with a continuous, circumferential groove 19 that is disposed midway between the grooves 13 and 16. Like the latter grooves, the grooves 19 are disposed radially with relation to the transverse curvature of the tire. Each groove 19 divides the tread face of each rib 17 in two ribs 20, 20 of equal width, and the depth of the grooves 19 is such that each rib 20 is of greater width than height. In effect, the ribs 20 constitute tertiary ribs that are superposed upon the secondary ribs 17 and are integral with the latter.

It is the ribs 20 that engage the surface of a roadway and provide traction for the tire as well as preventing lateral skidding thereof. Since the ribs 20 are of greater width than height, they possess lateral stability and do not flex laterally under static load or under lateral thrust such as occurs during skidding and when the vehicle travels around curves. Neither is there any longitudinal buckling or distortion of the ribs during braking of the vehicle. The primary ribs 14 and secondary ribs 17 also possess lateral stability, yet the presence of the relatively deep grooves 13 and grooves 16 of lesser depth provide adequate transverse flexibility of the tread so that sufficient area thereof is in contact with the roadway to provide driving traction.

Because the ribs 20 are stable and do not flex or collapse, their lateral faces always will be disposed substantially normal to the roadway when engaged therewith and wear will occur only on the peripheral face of the ribs. Thus there always will be sharp corners at peripheral margins of each rib, with the result that they offer superior resistance to lateral skidding as compared to similar ribs that have margins worn round due to abrasion while in fixed condition. Furthermore, because the ribs 20 always maintain an upright position, the intervening grooves always are open to receive water or moisture wiped from a wet pavement by adjacent ribs 20. Thus such moisture more easily and quickly escapes from under the ribs of the tread and skidding is more quickly suppressed.

As the ribs 20 disappear due to wear, the secondary ribs 17 are brought into play and wearing away of the latter eventually exposes the primary ribs 14. However, before the tire has worn down to the latter the tread easily may be regrooved, and by making said grooves of differential depth, substantially the original characteristics of the tread may be provided.

The improved tire tread makes for safety of driving and achieves the other objects set out in the foregoing statement of objects.

The embodiment of the invention shown in Figure 2 consists of a pneumatic tire casing comprising a tread portion formed with a multiplicity of continuous, circumferentially extending ribs 20, 20 that are essentially the same as the ribs 20 of the previously described embodiment of the invention, the distinguishing feature of the tire being the arrangement of the circumferential grooves that define said ribs. Thus the tread is divided transversely into major sections or ribs of greater width than height by a plurality of relatively deep circumferential grooves 22, 22. Centrally disposed between each pair of grooves 22, and between the outermost grooves 22 and the respective lateral margins of the tread, is a groove 23 of lesser depth than grooves 22, the grooves 22, 23 defining secondary ribs or sections of greater width than height. The peripheral surface of each secondary rib or section is divided into three circumferential ribs 20 of equal width by a pair of parallel circumferential grooves 24, 25, of which grooves 24 are deeper than grooves 25 but shallower than grooves 23 and are disposed adjacent the latter.

Other modifications may be resorted to without departing from the spirit of the invention or the scope of the appended claims.

What is claimed is:

1. A tire having a tread portion consisting of a plurality of relatively wide, continuous, circumferential primary ribs of greater width than height, a pair of continuous, circumferential, secondary ribs of greater width than height superposed upon said primary ribs and formed integral therewith, and a plurality of relatively narrow, continuous, circumferential, tertiary ribs of greater width than height superposed upon said secondary ribs and formed integral therewith, the lateral faces of each tertiary rib being of different heights.

2. A tire having a tread portion provided with a plurality of laterally spaced circumferentially extending ribs, the root base of each rib being inclined relatively to the portion of the tread base on which it is positioned, said ribs being arranged in pairs with an air space therebetween and with the root bases forming a V, whereby said ribs have greater flexibility away from each other than toward each other for the purposes described.

DE WITT T. HICKS.
VERNON L. SMITHERS.

---

CERTIFICATE OF CORRECTION.

Patent No. 2,164,819.      July 4, 1939.

DE WITT T. HICKS, ET AL.

It is hereby certified that error appears in the printed specification of the above numbered patent requiring correction as follows: Page 2, first column, line 12, for the word "fixed" read flexed; and that the said Letters Patent should be read with this correction therein that the same may conform to the record of the case in the Patent Office.

Signed and sealed this 22nd day of August, A. D. 1939.

Leslie Frazer (Seal)      Acting Commissioner of Patents.

sufficient area thereof is in contact with the roadway to provide driving traction.

Because the ribs 20 are stable and do not flex or collapse, their lateral faces always will be disposed substantially normal to the roadway when engaged therewith and wear will occur only on the peripheral face of the ribs. Thus there always will be sharp corners at peripheral margins of each rib, with the result that they offer superior resistance to lateral skidding as compared to similar ribs that have margins worn round due to abrasion while in fixed condition. Furthermore, because the ribs 20 always maintain an upright position, the intervening grooves always are open to receive water or moisture wiped from a wet pavement by adjacent ribs 20. Thus such moisture more easily and quickly escapes from under the ribs of the tread and skidding is more quickly suppressed.

As the ribs 20 disappear due to wear, the secondary ribs 17 are brought into play and wearing away of the latter eventually exposes the primary ribs 14. However, before the tire has worn down to the latter the tread easily may be regrooved, and by making said grooves of differential depth, substantially the original characteristics of the tread may be provided.

The improved tire tread makes for safety of driving and achieves the other objects set out in the foregoing statement of objects.

The embodiment of the invention shown in Figure 2 consists of a pneumatic tire casing comprising a tread portion formed with a multiplicity of continuous, circumferentially extending ribs 20, 20 that are essentially the same as the ribs 20 of the previously described embodiment of the invention, the distinguishing feature of the tire being the arrangement of the circumferential grooves that define said ribs. Thus the tread is divided transversely into major sections or ribs of greater width than height by a plurality of relatively deep circumferential grooves 22, 22. Centrally disposed between each pair of grooves 22, and between the outermost grooves 22 and the respective lateral margins of the tread, is a groove 23 of lesser depth than grooves 22, the grooves 22, 23 defining secondary ribs or sections of greater width than height. The peripheral surface of each secondary rib or section is divided into three circumferential ribs 20 of equal width by a pair of parallel circumferential grooves 24, 25, of which grooves 24 are deeper than grooves 25 but shallower than grooves 23 and are disposed adjacent the latter.

Other modifications may be resorted to without departing from the spirit of the invention or the scope of the appended claims.

What is claimed is:

1. A tire having a tread portion consisting of a plurality of relatively wide, continuous, circumferential primary ribs of greater width than height, a pair of continuous, circumferential, secondary ribs of greater width than height superposed upon said primary ribs and formed integral therewith, and a plurality of relatively narrow, continuous, circumferential, tertiary ribs of greater width than height superposed upon said secondary ribs and formed integral therewith, the lateral faces of each tertiary rib being of different heights.

2. A tire having a tread portion provided with a plurality of laterally spaced circumferentially extending ribs, the root base of each rib being inclined relatively to the portion of the tread base on which it is positioned, said ribs being arranged in pairs with an air space therebetween and with the root bases forming a V, whereby said ribs have greater flexibility away from each other than toward each other for the purposes described.

DE WITT T. HICKS.
VERNON L. SMITHERS.

---

CERTIFICATE OF CORRECTION.

Patent No. 2,164,819.                            July 4, 1939.

DE WITT T. HICKS, ET AL.

It is hereby certified that error appears in the printed specification of the above numbered patent requiring correction as follows: Page 2, first column, line 12, for the word "fixed" read flexed; and that the said Letters Patent should be read with this correction therein that the same may conform to the record of the case in the Patent Office.

Signed and sealed this 22nd day of August, A. D. 1939.

Leslie Frazer (Seal)                                          Acting Commissioner of Patents.